US00RE33933E

United States Patent [19]

Hou

[11] E Patent Number: Re. 33,933

[45] Reissued Date of Patent: May 19, 1992

[54] TOY MUSIC ROCKING CHAIR

[76] Inventor: Jack Hou, 8F No. 185 Yung Chi Road, Taipei, Taiwan

[21] Appl. No.: 378,401

[22] Filed: Jul. 11, 1989

Related U.S. Patent Documents

Reissue of:

[64] Patent No.: 4,708,689
Issued: Nov. 24, 1987
Appl. No.: 914,146
Filed: Oct. 1, 1986

[51] Int. Cl.[5] ..... G10K 1/06

[52] U.S. Cl. ..... 446/301; 446/342; 84/95.2

[58] Field of Search ..... 446/301, 342, 297, 482, 446/397; 84/94 C, 95.2

[56] References Cited

U.S. PATENT DOCUMENTS

| | | |
|---|---|---|
| 51,029 | 11/1865 | Ellinwood . |
| 2,251,141 | 7/1941 | Lehman, Jr. . |
| 2,301,967 | 11/1942 | Nosker et al. . |
| 2,404,470 | 7/1946 | Zemen . |
| 2,622,445 | 12/1952 | Benedict . |
| 2,806,397 | 9/1957 | Nichols, Jr. . |
| 3,125,826 | 3/1964 | Ostrander . |
| 3,191,930 | 6/1965 | Cottrell et al. . |
| 3,398,588 | 8/1968 | Meier . |
| 3,429,068 | 2/1969 | Gardel et al. . |
| 3,477,169 | 11/1969 | Gardel et al. . |
| 4,050,342 | 9/1977 | Suzuki et al. . |
| 4,052,898 | 10/1977 | Miller et al. . |
| 4,272,996 | 6/1981 | Sauerwein . |
| 4,626,224 | 12/1986 | Benson et al. ..... 446/297 |

FOREIGN PATENT DOCUMENTS

| | | |
|---|---|---|
| 30243 | 3/1926 | France . |
| 298766 | 7/1954 | Switzerland . |
| 1218 | of 1891 | United Kingdom . |
| 754047 | 8/1956 | United Kingdom . |

*Primary Examiner*—Victor N. Sakran
*Attorney, Agent, or Firm*—Bacon & Thomas

[57] ABSTRACT

A toy music rocking chair comprises a music box and a transmission system. The transmission system further consists of an arm fixed to the shaft of the music box, a stub extending from the arm, a reciprocating plate having a lateral slot for the stub to fit in, a reciprocating rod and a slide mechanism connected to the reciprocating rod and installed in the head of the doll rocker serving as eyes so that when the shaft turns, the rotary motion of the stub can be changed into reciprocating motion of the reciprocating plate and rod which, in turn, cause the rocking chair to sway back and forth, and the eyelids to open and close as though the doll rocker is sleepy.

8 Claims, 3 Drawing Sheets

TOY MUSIC ROCKING CHAIR

Matter enclosed in heavy brackets [ ] appears in the original patent but forms no part of this reissue specification; matter printed in italics indicates the additions made by reissue.

BACKGROUND OF THE INVENTION

There has been a kind of toy comprising a music box and a doll or wooden horse. Driven by the shaft of the music box, the doll or wooden horse mounted on a platform will revolve back and forth while the music box gives a melody. Many curious people like it very much.

To make it more interesting and to have its music and movement become more natural and harmonous, this invention improves the simple, rotary motion of the conventional toy and provides a music rocking chair with a doll sitting in. With the turning of the shaft of the music box, the chair sways back and forth and the eyelids of the doll open and close. The movement is so natural that the doll rocker appears to be in a sleepy state.

SUMMARY OF THE INVENTION

This invention relates to a music rocking chair comprising a music box and a transmission system which can change rotary motion into reciprocating motion. The reciprocating plate of the transmission system can make the rocking chair sway back and forth and the reciprocating rod can cause the eyelids to open and close while the music box produces soft, high-pitched sounds of great delicacy.

DESCRIPTION OF THE PREFERRED EMBODIMENT

Figure 1:
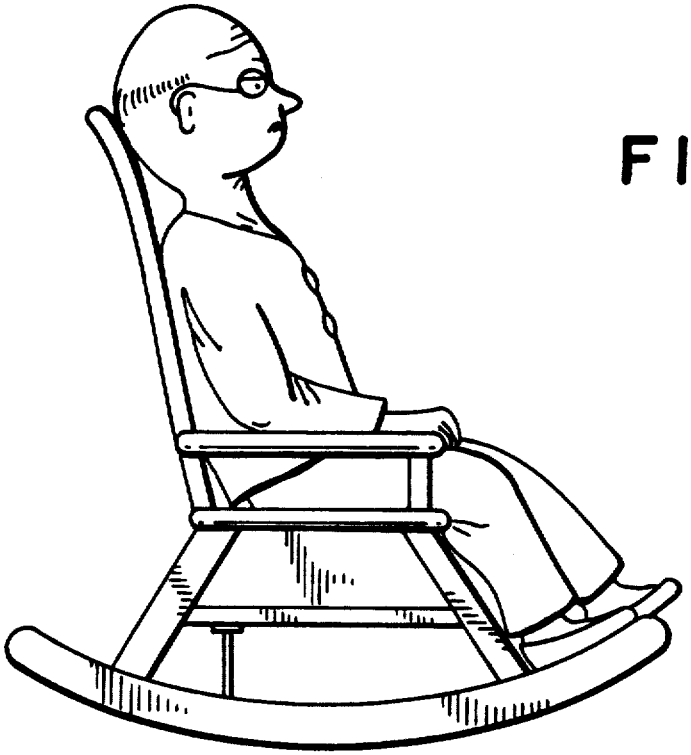
FIG. 1 is a vertical view of the toy music rocking chair of this invention.
Figure 2:
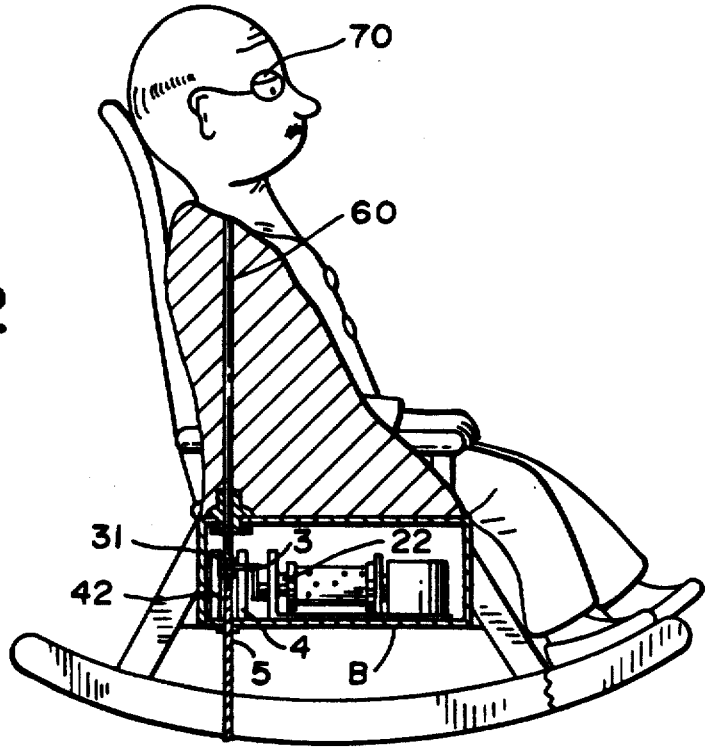
FIG. 2 is a longitudinal section of the said chair.
Figure 3:
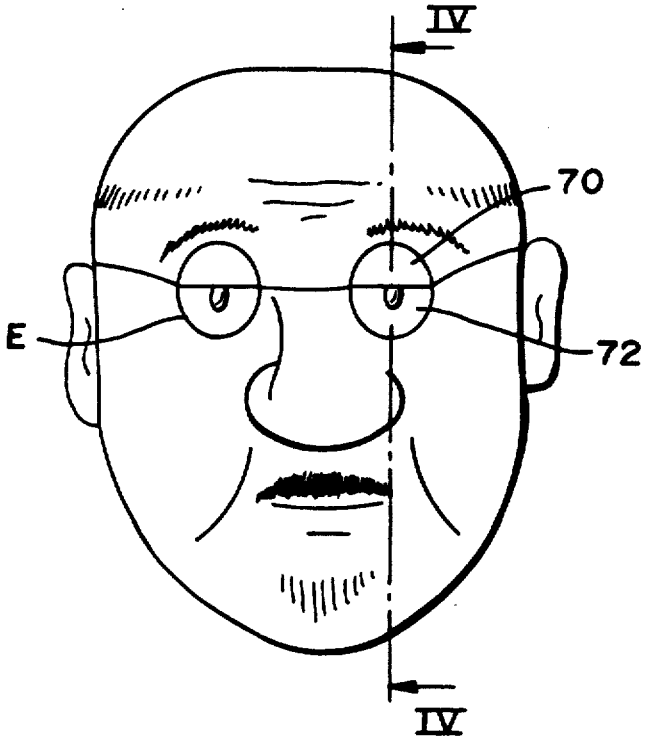
FIG. 3 is a sectional view of the head of the doll rocker of this invention.

FIG. 1 shows a doll rocker sitting in a rocking chair. As shown in FIG. 2, the rocking chair has a box B under the seat and a music-box movement 2 in the box B. The shaft 22 of the music box has an arm 3 with a stub 31. The stub 31 is parallel to the shaft 22 and extends from the rear and of the arm 3.

Figure 4:
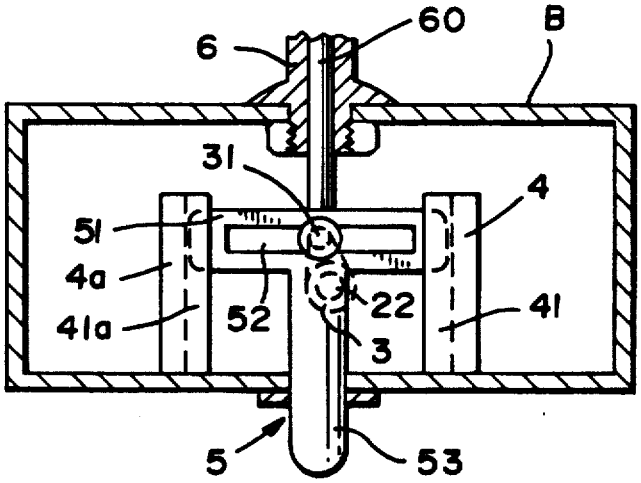
FIG. 4 is a bottom view of the said chair.

As shown in the FIG. 2 and FIG. 4, the shaft 22 of the music box 2 has an arm 3 at the rear end and the arm 3 has a stub 31 extending from the rear end. The stub 31 is fitted in the slot 52 of the reciprocating plate 5. With the shaft 22 rotating, the stub 31 revolves and moves in the slot 52 of the reciprocating plate 5. The rotary motion of the stub 31 causes the reciprocating plate 5 to slide up and down. Two struts 4, 4a provided in the box B have slide grooves 41, 41a respectively for the reciprocating plate 5 to slide. The lateral slot 52 of the reciprocating plate 5 is greater in width than the diameter of the stub and in length than the diameter of the circle in which the stub 31 moves. When the reciprocating plate 5 goes up, the lower part 53 of the plate 5 leaves the ground slightly so that the rocking chair can sway back completely. When the reciprocating plate 5 goes down and its lower part 53 touches the ground, it props up the chair and makes it sway forth. Based on this, the length of the lower part 53 of the reciprocating plate is determined.

A guide socket 6 is provided in the top of the box B to guide the reciprocating rod 60 so that the rod 60 is in alignment with the top end of the reciprocating plate 5. The reciprocating rod 60 is slidably fitted in the guide socket 6 and connected with a connecting rod 71 to the slide mechanism 7. The reciprocating rod 60 pushed by the reciprocating plate 5 carries the motion of the shaft 22 to the control handle 71 and makes the slide plate 70 (eyelid) to slide up and down.

Figure 5:
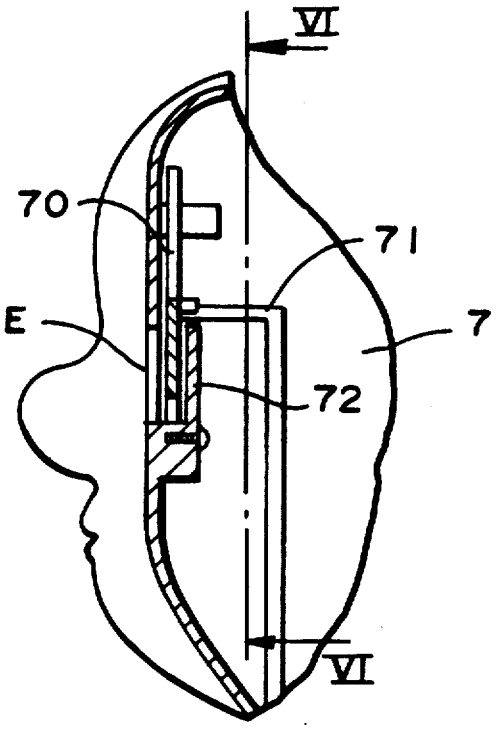
FIG. 5 is a view taken along the line A—A of FIG. 3.
Figure 6:
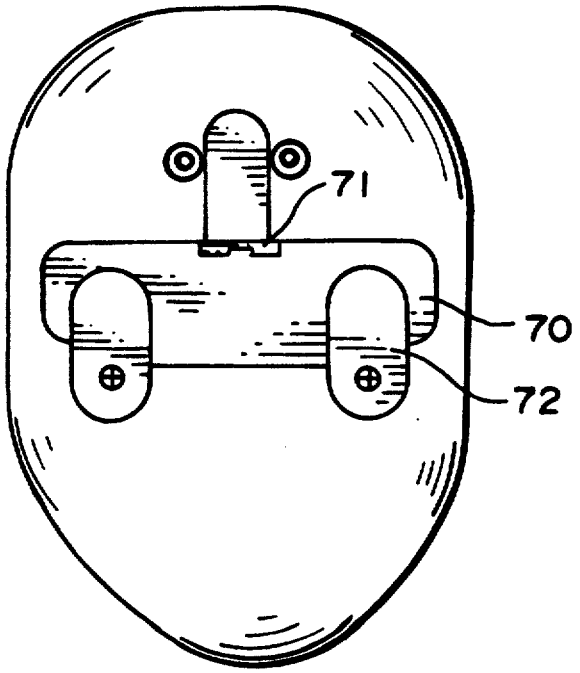
FIG. 6 is a view taken along the line B—B of FIG. 5.

The said slide mechanism 7 is in the head of the doll rocker. As shown in FIGS. 5 and 6, a guard 72 is provided in the eyelet E of the doll and painted as eyeballs. A specific gap is provided in front of the guard 72 for the slide plate 70 to slide in. The slide plate 70 can slide down from the upper rim of the eyelet E as a human eyelid. The slide plate 70 is connected to the reciprocating rod at an appropriate place on the central line by means of a connecting rod 71 so the slide plate 70 can slide up and down slowly, with the motion of the reciprocating rod.

Accordingly, while the music box produces soft, high-pitched sounds of great delicacy, the shaft 22 drives the reciprocating plate 5 through the arm 3 and stub 31 to make the rocking chair to sway back and forth, and to push the reciprocating rod to cause the eyelids to close slowly as though the doll rocker is sleepy.

I claim:

1. A toy music rocking chair including a seat comprising:

(a) a music box supported below the seat, the box including a shaft having a rear end;

(b) a transmission system including an arm, the arm being secured to the rear end of the shaft;

(c) a stub extending from the arm;

(d) a reciprocating plate including a lateral slot for receiving the stub therein whereby rotary motion of the stub can be changed into reciprocating motion of the rod for causing the rocking chair to sway back and forth;

(e) a pair of struts disposed within the box, the struts being provided with grooves for slidably receiving the reciprocating plate therein;

(f) a guide socket on the top of the box;

(g) a doll rocker supported on the seat, the doll rocker including a pair of movable eyelids; and (h) a reciprocating rod disposed through the guide socket for causing the eyelids to open and close slowly as though the doll rocker is sleepy.

2. A toy music rocking chair including a seat comprising:

(a) a music box supported below the seat, the box including a shaft having a rear end;

(b) a transmission system including an arm, the arm being secured to the rear end of the shaft;

(c) a stub extending from the arm;

(d) a reciprocating plate including a lateral slot for receiving the stub therein so that rotary motion of the stub can be changed into reciprocating motion of the rod to cause the rocking chair to sway back and forth;

(e) a guide socket on the top of the box;

(f) a reciprocating rod disposed through the guide socket;

(g) a doll rocker supported on the seat, the doll rocker including a head; and (h) a slide mechanism disposed within the head of the doll rocker and including a pair of guards painted like eyeballs, a pair of movable slides serving as eyelids, the slides being connected to the reciprocating rod whereby reciprocating motion of the rod will cause the slides to open and close slowly as though the doll rocker is sleepy.

*3. A toy device adapted for movement comprising:*

*a) a music box supported on the toy device, the music box including a rotatable driving shaft having a protruding end, the music box comprising a power source for causing movement of the toy device;*

*b) a transmission system including a rotatable element secured to the protruding end of the driving shaft so as to rotate therewith;*

*c) a stub extending from the rotatable element so as to rotate therewith; and,*

*d) a reciprocating plate defining a follower surface in contact with the stub such that rotary motion of the rotatable driving shaft of the music box causes rotary motion of the rotatable element which, in turn, causes rectilinear reciprocating motion of the plate whereby such rectilinear motion of the plate imparts movement to the toy device.*

*4. The toy device according to claim 3 further comprising guide means operatively associated with the reciprocating plate to guide during its reciprocating movement.*

*5. The toy device according to claim 4 wherein the guide means is associated with the music box.*

*6. The toy device according to claim 3 wherein the toy has movable elements and further comprising:*

*a) a reciprocating rod operatively attached to the reciprocating plate so as to reciprocate therewith; and,*

*b) means attaching the rod to the movable elements such that reciprocation of the rod causes movement of the elements.*

*7. The toy device according to claim 3 further comprising rocker means associated with the toy device and located such that the rectilinear reciprocating motion of the plate imparts a rocking motion to the toy device relative to the support surface.*

*8. The toy device according to claim 3 wherein the reciprocating plate has a portion in contact with a support surface such that the rectilinear reciprocating motion of the plate imparts movement to the toy device relative to the support surface.*

* * * * *

US001033933B1

REEXAMINATION CERTIFICATE (3445th)

United States Patent [19]

Hou

[11] B1 Re. 33,933

[45] Certificate Issued Mar. 3, 1998

[54] TOY MUSIC ROCKING CHAIR

[75] Inventor: Jack Hou, Taipei, Taiwan

[73] Assignee: Giftec, Ltd., Alexandria, Va.

Reexamination Request:
No. 90/003,505, Jul. 22, 1994

Reexamination Certificate for:

| | |
|---|---|
| Patent No.: | **1,033,933** |
| Issued: | **May 19, 1992** |
| Appl. No.: | **378,401** |
| Filed: | **Jul. 11, 1989** |

Related U.S. Patent Documents

Reissue of:

| | |
|---|---|
| [64] Patent No.: | **4,708,689** |
| Issued: | **Nov. 24, 1987** |
| Appl. No.: | **914,146** |
| Filed: | **Oct. 1, 1986** |

[51] Int. Cl.[6] ..... A63H 3/28; G10F 1/06

[52] U.S. Cl. ..... 446/301; 446/342; 84/95.2

[58] Field of Search ..... 446/325, 326, 446/396, 301, 342, 358; 84/95.2, 94.2

[56] References Cited

U.S. PATENT DOCUMENTS 143,082 9/1873 La Grove ..... 446/358

FOREIGN PATENT DOCUMENTS 2 177 258 10/1983 United Kingdom .

OTHER PUBLICATIONS

Sankyo Application Card No. 0025, publication date unknown.

Sankyo Application Card No. 0031, publication date unknown.

Sankyo Application Card No. 0043, publication date unknown.

*Ingenious Mechanisms For Designers And Inventors*, vol. 1 (Franklin D. Jones ed., 11th ed. 1957).

*Primary Examiner*—Mickey Yu

[57] ABSTRACT

A toy music rocking chair comprises a music box and a transmission system. The transmission system further consists of an arm fixed to the shaft of the music box, a stub extending from the arm, a reciprocating plate having a lateral slot for the stub to fit in, a reciprocating rod and a slide mechanism connected to the reciprocating rod and installed in the head of the doll rocker serving as eyes so that when the shaft turns, the rotary motion of the stub can be changed into reciprocating motion of the reciprocating plate and rod which, in turn, cause the rocking chair to sway back and forth, and the eyelids to open and close as though the doll rocker is sleepy.

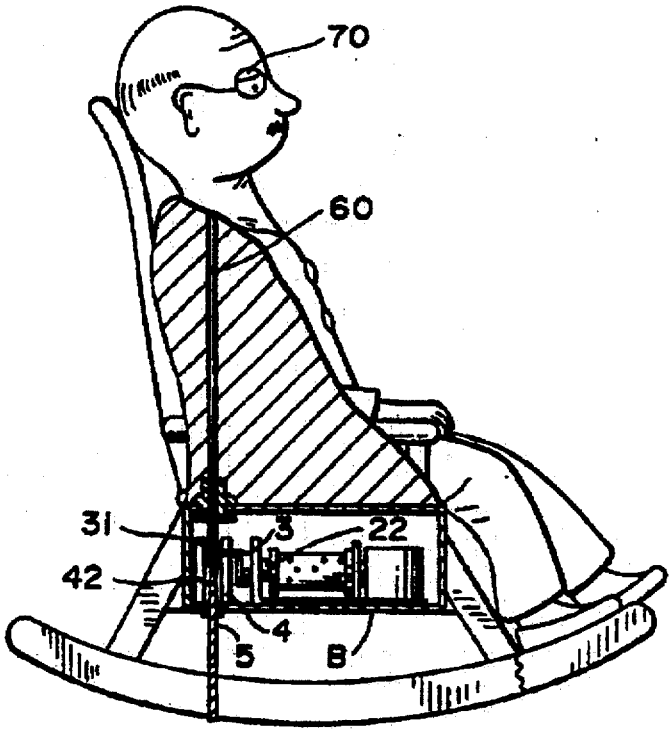

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1 and 2 is confirmed.

Claims 3–8 are cancelled.

* * * * *